United States Patent
Zhou

(10) Patent No.: US 9,887,410 B2
(45) Date of Patent: Feb. 6, 2018

(54) FLEXIBLE FUSIBLE LINK, SYSTEMS, AND METHODS

(71) Applicant: SinoElectric Powertrain Corporation, Sunnyvale, CA (US)

(72) Inventor: Peng Zhou, El Cerrito, CA (US)

(73) Assignee: OCTILLION ENERGY HOLDINGS, INC., Hayward, CA (US)

( * ) Notice: Subject to any disclaimer, the term of this patent is extended or adjusted under 35 U.S.C. 154(b) by 0 days.

(21) Appl. No.: 14/220,411

(22) Filed: Mar. 20, 2014

(65) Prior Publication Data

US 2014/0205874 A1 Jul. 24, 2014

Related U.S. Application Data

(62) Division of application No. 12/779,884, filed on May 13, 2010, now abandoned.

(60) Provisional application No. 61/178,650, filed on May 15, 2009.

(51) Int. Cl.
*H01M 2/10* (2006.01)
*H01M 2/34* (2006.01)
*H01H 85/08* (2006.01)
*H01H 85/02* (2006.01)

(52) U.S. Cl.
CPC .............. *H01M 2/34* (2013.01); *H01H 85/08* (2013.01); *H01M 2/1061* (2013.01); *H01H 2085/025* (2013.01); *H01M 2200/00* (2013.01)

(58) Field of Classification Search
CPC .... H01M 2/34; H01M 2/1061; H01M 2/1072; H01M 2/1083; H01M 10/5016; H01M 2200/00; H01H 85/08; H01H 85/055; H01H 85/20; H01H 2085/025

See application file for complete search history.

(56) References Cited

U.S. PATENT DOCUMENTS

| | | | | |
|---|---|---|---|---|
| 5,903,154 | A | * | 5/1999 | Zhang ................ G01R 31/3696 324/437 |
| 2005/0183555 | A1 | * | 8/2005 | Santos ..................... B26D 7/18 83/13 |
| 2007/0188147 | A1 | * | 8/2007 | Straubel ................ H01M 2/202 320/134 |

* cited by examiner

*Primary Examiner* — Raymond Alejandro

(57) ABSTRACT

A fusible link includes a current collector element, a battery cell conductor pad, and at least one fusible conductor connecting the current collector element and the battery cell conductor pad. The current collector element can be a current collector conductor pad, a current collector conductor pad and a current collector plate, or a fuse sheet. A battery cell has an anode electrode and a cathode electrode, a separate fusible link is coupled to at least one of the battery cell electrodes. The battery cell conductor pad is electrically and mechanically attached to each battery cell electrode. The fusible conductor opens under excessive current flow, and has sufficient service loop length to allow relative in-plane and out-of-plane motions between the battery cell electrode and the current collector element. The fusible links can be applied to each of a plurality of battery cells included in a battery pack.

12 Claims, 6 Drawing Sheets

FLEXIBLE FUSIBLE LINK, SYSTEMS, AND METHODS

RELATED APPLICATIONS

This application is a divisional of, claims priority to, and the benefit of U.S. Publication No. 2010/0291426, published Nov. 18, 2010, and entitled "Flexible Fusible Link, Systems, and Methods," (U.S. patent application Ser. No. 12/779,884 filed May 13, 2010) which claims priority to U.S. Provisional Application No. 61/178,650, filed May 15, 2009, and entitled "Flexible Fusible Link, Systems, and Methods," both of which are incorporated by reference in entirety.

FIELD OF THE INVENTION

The present invention relates to the field of batteries. More particularly, the present invention relates to the field of battery packs having multiple batteries connected using fusible links.

BACKGROUND OF THE INVENTION

A battery is a device that converts chemical energy to electrical energy. The battery is a combination of one or more electrochemical cells, each cell consists of two half-cells connected in series by a conductive electrolyte. One half-cell includes electrolyte and an electrode to which negatively-charged ions migrate, for example the anode or negative electrode. The other half-cell includes electrolyte and an electrode to which positively-charged ions migrate, for example the cathode or positive electrode. The electrodes do not touch each other but are electrically connected by the electrolyte. Many cells use two half-cells with different electrolytes. In this configuration, each half-cell is separated by a separator. The separator is porous to ions, but not the electrolytes, thereby enabling ions to pass but preventing mixing of the electrolytes between the two half-cells.

A battery explosion may occur through misuse or malfunction of the battery, such as attempting to recharge a non-rechargeable battery or short circuiting a battery. When a battery is recharged at an excessive rate, an explosive gas mixture may be produced leading to pressure build-up and the possibility of the battery case bursting. Overcharging, which occurs when attempting to charge a battery beyond its electrical capacity, can also lead to a battery explosion, leakage, or irreversible damage to the battery.

Numerous battery safety precautions have been developed. High temperature shut down separators are designed to prevent thermal runaway and explosion. In an exemplary configuration, the separator includes an inner porous layer having a first melting temperature surrounded by an outer porous layer having a second melting temperature that is lower than the first melting temperature. For example, the inner porous layer can be poly propylene and the outer porous layer can be poly ethylene. If the battery cell is short-circuited and begins to increase in temperature, then the outer porous layer melts when the temperature reaches the first melting temperature. Melting of the outer porous layer fills the holes in the outer porous layer as well as some or all of the holes in the inner porous layer. Filling the holes stops the chemical reaction within the battery cell.

A polymeric positive temperature coefficient (PTC) device is a disk like device that can be connected to the positive electrode of the battery. The PTC device has the characteristic that if the temperature exceeds a threshold temperature, the electrical resistance of the PTC device increases several orders of magnitude, which inhibits current flow through the device. In this manner, the PTC device functions as a type of circuit breaker. When the current flowing through the device exceeds the current limit, the temperature increases above the threshold temperature, thereby greatly increasing the electrical resistance and inhibiting current flow.

In some configurations, a vent valve is incorporated into the battery housing. The vent valve is connected to the electrode via a conducting wire. If the internal pressure within the battery cell rises above a threshold pressure, then the vent valve blows, which physically separates the conducting wire from the electrode, thereby disabling current flow out of the battery. This is another form of a current interrupt device (CID).

Each of these safety precautions is effective when applied to a single battery cell.

However, additional considerations are necessary when addressing battery packs. A battery pack is a connected set of battery cells. Battery cells can be configured in series, parallel, or a mixture of both to deliver the desired voltage, capacity, or power density. Components of a battery pack include the individual battery cells and the interconnects which provide electrical conductivity between them. In many battery packs, current collector plates are used to collect the current output from each of the battery cells in the battery pack. A first current collector plate is connected to the anodes of each of the battery cells, and a second current collector plate is connected to the cathodes of each of the battery cells.

If one of the battery cells in a battery pack becomes faulty, such as short-circuiting, the faulty battery cell begins to increase in temperature. The battery cell can include any of the safety precautions described above to prevent further internal reaction and current flow within the faulty battery cell. However, in the battery pack, the faulty battery cell remains connected to active battery cells via the current collector plates. Current output from the active battery cells will flow to the faulty battery cell since the faulty battery cell is essentially a short within the battery pack circuit. This results in a large amount of current flowing into the faulty battery cell, which may lead to thermal runaway and a potential explosion. To prevent current from active battery cells from flowing into a faulty battery cell, the faulty battery cell needs to be electrically isolated.

A fusible link is a type of electrical fuse. At least one electrode of a battery cell is connected to a current collector plate via a fusible link. The fusible link functions as a current interrupt device between the battery cell and the current collector plate. The fusible link is typically a short piece of relatively thin metal wire or strip that melts when excessive current is applied, which interrupts the connection between the battery cell and the current collector plate. Short circuit, overload, or device failure is often the reason for excessive current. The size and construction of the fusible link is determined so that the heat produced for normal current does not cause the wire to melt and open the circuit.

A method of forming fusible links between battery cell electrodes and current collector plates is via a wire bond. Each bonding wire function as a fusible link and opens (melts) under excessive current, thereby disabling current flow through the faulted battery cell and electrically isolating the faulted battery cell from the active battery cells in the battery pack. However, the wire bonds are very fragile and are rigidly attached to the battery cell and the current collector plate. Under shock and vibration load, especially that seen in electric vehicles utilizing battery packs, the wire bonds are prone to breakage. One approach is to use adhesive to firmly attach the battery cells to the current collector plates to minimize relative motion between the two. This adds manufacturing cost and complexity. Moreover, this approach loses the ability to service individual battery cells since all battery cells are permanently attached to the current collector plates and cannot be reworked.

SUMMARY OF THE INVENTION

In some embodiments, a fusible link assembly for use with a battery cell includes a fuse sheet and a plurality of fusible links. The fuse sheet is made of electrically conductive material and has a planar body. The plurality of fusible links are defined by the fuse sheet and each of the fusible links is flexibly shaped to enable at least one of an in-plane and out-of-plane movement of the fusible link.

In some embodiments, a battery pack for use in an electric vehicle includes a first and second fuse sheet, a plurality of fusible links defined by the first fuse sheet, a first current collector plate coupled to the first fuse sheet, a battery cell holder coupled to the first current collector plate, a second current collector plate coupled to ach of the battery cell holder and the first current collector plate. Each of the fuse sheets are made of electrically conductive material. The plurality of first fusible links are each flexibly shaped. The battery cell holder is configured to hold a plurality of battery cells of an electric vehicle.

In some embodiments, a fusible link assembly for use with a plurality of battery cells includes: a fuse sheet made of electrically conductive material, a plurality of fusible links defined by the fuse sheet, and a current collector plate coupled to the fuse sheet. Each of the fusible links is flexibly shaped. Locations within the fuse sheet of respective fusible links align with corresponding openings in the current collector plate.

Embodiments of a fusible link include a current collector element, a battery cell conductor pad, and at least one fusible conductor connecting the current collector element and the battery cell conductor pad. The current collector element can be a current collector conductor pad, a current collector conductor pad and a current collector plate, or a fuse sheet. A battery cell has an anode electrode and a cathode electrode, at least one fusible link is coupled to one of the electrodes. The battery cell conductor pad is electrically and mechanically attached to each battery cell electrode to which a fusible link is coupled. The fusible conductor opens under excessive current flow, and has sufficient service loop length to allow relative in-plane and out-of-plane motions between the battery cell electrode and the current collector element. The fusible links can be applied to each of a plurality of battery cells included in a battery pack.

In one aspect, a fusible link is disclosed. The fusible link includes a current collector conductor pad; a battery cell conductor pad; and at least one fusible conductor coupled between the current collector conductor pad and the battery cell conductor pad, wherein the at least one fusible conductor is flexibly shaped to enable relative movement between the current collector conductor pad and the battery cell conductor pad. The fusible conductor opens when a current flow through the fusible conductor reaches a threshold current. The fusible conductor has a service loop length to enable relative in-plane and out-of-plane motions between the battery cell conductor pad and the current collector conductor pad. In some embodiments, the fusible conductor is spiral shaped. In other embodiments, said fusible conductor is accordion shaped. A material of the fusible link can be selected from the group consisting of aluminum, copper, nickel, zinc, and any combination thereof. The fusible link can be fabricated via etching, stamping, and laser cutting.

In another aspect, a fusible link assembly is disclosed. The fusible link assembly includes a battery cell including a first electrode and a second electrode; a first fusible link comprising a first current collector element, a first battery cell conductor pad coupled to the first electrode of the battery cell, and at least one first fusible conductor coupled between the first current collector element and the first battery cell conductor pad, wherein the at least one first fusible conductor is flexibly shaped to enable relative movement between the first current collector element and the battery cell; and a conductive link coupled to the second electrode.

In some embodiments, the fusible link assembly also includes a battery cell holder configured to support the battery cell. The battery cell holder can include a first surface having a first surface opening aligned with the first electrode of the battery cell, and the battery cell holder can include a second surface having a second surface opening aligned with the second electrode of the battery cell. In some embodiments, the first current collector element comprises a first current collector conductor pad and the conductive link comprises a second current collector conductor pad. In this embodiment, where the fusible link assembly also includes a battery cell holder configured to support the battery cell, the first current collector conductor pad and the second current collector conductor pad can each be coupled to the battery cell holder. In some embodiments, the first current collector element comprises a first current collector conductor pad electrically and mechanically coupled to a first current collector plate, and the conductive link comprises a second current collector conductor pad electrically and mechanically coupled to a second current collector plate. In this embodiment, where the fusible link assembly also includes a battery cell holder configured to support the battery cell, the first current collector plate and the second current collector plate can each be coupled to the battery cell holder. The first current collector conductor pad can be coupled to the first current collector plate and the second current collector conductor pad can be coupled to the second current collector plate using one of the group consisting of resistance welding, laser welding, ultrasonic welding, brazing, soldering, mechanical fasteners, and conductive adhesives.

In some embodiments, the first current collector element comprises a first fuse sheet coupled to the first fusible conductor. In this embodiment, where the fusible link assembly also includes a battery cell holder configured to support the battery cell, the first fuse sheet can be coupled to the battery cell holder. The first fusible conductor and the first battery cell conductor pad can be integrally formed with the first fuse sheet.

In some embodiments, the first battery cell conductor pad is electrically and mechanically coupled to the first electrode of the battery cell. The first battery cell conductor pad can be coupled to the first electrode using one of the group consisting of resistance welding, laser welding, ultrasonic welding, mechanical fasteners, and conductive adhesives. In some embodiments, the first current collector element is coupled to a first output terminal, and the conductive link is coupled to a second output terminal In some embodiments, the first fusible conductor opens when a current flow through the first fusible conductor reaches a threshold current.

In some embodiments, the first fusible conductor has a service loop length to enable relative in-plane and out-of-plane motions between the first battery cell conductor pad and the first current collector element. In some embodiments, the first fusible conductor is spiral shaped. In other embodiments, the first fusible conductor is accordion shaped. In some embodiments, a material of the first fusible link is selected from the group consisting of aluminum, copper, nickel, zinc, and any combination thereof. In some embodiments, the first fusible link is fabricated via etching, stamping, or laser cutting.

In some embodiments, the conductive link comprises a second fusible link comprising a second current collector element, a second battery cell conductor pad coupled to the second electrode of the battery cell, and at least one second fusible conductor coupled between the second current collector element and the second battery cell conductor pad, wherein the at least one second fusible conductor is flexibly shaped to enable relative movement between the second current collector element and the battery cell.

In yet another aspect, a battery pack is disclosed. The battery pack includes a plurality of battery cells, each battery cell includes a first electrode and a second electrode; a first fusible link comprising a first current collector element, a plurality of first battery cell conductor pads, and a plurality of first fusible conductors, wherein each of the first battery cell conductor pads is coupled to a corresponding one first electrode and at least one first fusible conductor is coupled between the first current collector element and each first battery cell conductor pad, further wherein each of the first fusible conductors are flexibly shaped to enable relative movement between the first current collector element and the corresponding battery cell to which the first fusible conductor is coupled; and a conductive link coupled to each of the second electrodes.

In some embodiments, the battery pack also includes a battery cell holder configured to support the plurality of battery cells. The battery cell holder can include a first surface having a plurality of first surface openings, one first surface opening aligned with one of the first electrodes of the plurality of battery cells, and the battery cell holder can include a second surface having a plurality of second surface openings, one second surface opening aligned with one of the second electrodes of the plurality of battery cells. In some embodiments, the first current collector element comprises a plurality of first current collector conductor pads, one first current collector conductor pad coupled to one of the plurality of first fusible conductors. In this embodiment, where the battery pack includes a battery cell holder configured to support the plurality of battery cells, the plurality of first current collector conductor pads can each be coupled to the battery cell holder. In some embodiments, the first current collector element comprises a plurality of first current collector conductor pads electrically and mechanically coupled to at least one first current collector plate. In this embodiment, where the battery pack includes a battery cell holder configured to support the plurality of battery cells, the at least one first current collector conductor plate can be coupled to the battery cell holder. The plurality of first current collector conductor pads can be coupled to the at least one first current collector plate using one of the group consisting of resistance welding, laser welding, ultrasonic welding, brazing, soldering, mechanical fasteners, and conductive adhesives.

In some embodiments, the first current collector element comprises at least one first fuse sheet coupled to the plurality of first fusible conductors. In this embodiment, the plurality of first fusible conductors and the plurality of first battery cell conductor pads coupled to the plurality of first fusible conductors can be arranged in a first array on the at least one first fuse sheet, each position of the first array is aligned with one first electrode of the plurality of battery cells. In the embodiment where the battery pack includes a battery cell holder configured to support the battery cell, the first fuse sheet can be coupled to the battery cell holder. In some embodiments, the plurality of first fusible conductors and the plurality of first battery cell conductor pads are integrally formed with the first fuse sheet.

In some embodiments, each of the plurality of first battery cell conductor pads is electrically and mechanically coupled to one of the first electrode of the plurality of battery cells. The first battery cell conductor pad can be coupled to the first electrode using one of the group consisting of resistance welding, laser welding, ultrasonic welding, mechanical fasteners, and conductive adhesives. In some embodiments, the first current collector element is coupled to a first output terminal, and the conductive link is coupled to a second output terminal. In some embodiments, each of the plurality of first fusible conductors opens when a current flow through the first fusible conductor reaches a threshold current.

In some embodiments, each of the plurality of first fusible conductors has a service loop length to enable relative in-plane and out-of-plane motions between the corresponding first battery cell conductor pad and the first current collector element. In some embodiments, each of the plurality of first fusible conductors are spiral shaped. In other embodiments, each of the plurality of first fusible conductors are accordion shaped. In some embodiments, a material of the first fusible link is selected from the group consisting of aluminum, copper, nickel, zinc, and any combination thereof. In some embodiments, the first fusible link is fabricated via etching, stamping, or laser cutting.

In some embodiments, the conductive link comprises a second fusible link comprising a second current collector element, a plurality of second battery cell conductor pads, and a plurality of second fusible conductors, wherein each of the second battery cell conductor pads is coupled to a corresponding one second electrode and at least one second fusible conductor is coupled between the second current collector element and each second battery cell conductor pad, further wherein each of the second fusible conductors are flexibly shaped to enable relative movement between the second current collector element and the corresponding battery cell to which the second fusible conductor is coupled.

BRIEF DESCRIPTION OF THE DRAWINGS

Embodiments of the fusible link are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Figure 1:
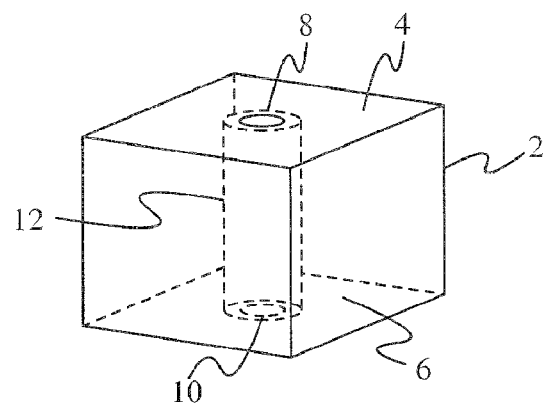
FIG. 1 illustrates a structure for holding and storing a battery cell according to an embodiment.

Embodiments of the present application are directed to a fusible link Those of ordinary skill in the art will realize that the following detailed description of the fusible link is illustrative only and is not intended to be in any way limiting. Other embodiments of the fusible link will readily suggest themselves to such skilled persons having the benefit of this disclosure.

Reference will now be made in detail to implementations of the fusible link as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A fusible link is configured to include a flexible fusible conductor to enable relative movement of a battery cell and a current collecting element coupled together without damaging the fusible connection. Embodiments of the fusible link are directed to a battery cell conductor pad, a current collector, and at least one fusible conductor connecting the battery cell conductor pad and the current collector. A battery cell includes an anode electrode and a cathode electrode. In some embodiments, the battery cell is secured within a battery cell holder having at least a first opening for access to the anode electrode and a second opening for access to the cathode electrode. In some embodiments, a fusible link is coupled to one of the battery cell electrodes, while a non-fusible link is coupled to the other electrode. In other embodiments, a first fusible link is coupled to the anode electrode, and a second fusible link is coupled to the cathode electrode. A fusible link has a battery cell conductor pad electrically and mechanically coupled to the battery cell electrode. In some embodiments, the current collector is a current collector conductor pad. In some embodiments, the current collector conductor pads are mechanically coupled to the battery cell holder. A current collector conductor pad is coupled to the battery cell holder adjacent to the opening at the corresponding battery cell electrode.

In other embodiments, the current collector includes a current collector plate and current collector conductor pad. In some embodiments, the current collector plate is mechanically coupled to the battery cell holder. The current collector plate has at least one plate opening aligned with an opening in the battery cell holder and one of the electrodes of the battery cell. If a second fusible link having a current collector plate is coupled to the other electrode, then another current collector plate has at least one plate opening aligned with an opening in the battery cell holder and the other electrode of the battery cell. In this embodiment, the current collector conductor pad is electrically and mechanically coupled to the current collector. The current collector conductor pad is coupled to the current collector plate adjacent to the plate opening at the electrode.

At least one fusible conductor is coupled between the current collector conductor pad and the battery cell conductor pad. Current flows between the battery cell conductor pad and the current collector conductor pad through the fusible conductor. Each fusible conductor melts, and thereby opens, under excessive current flow. In this manner, the fusible conductor functions as a fuse and stops current flow into and out of the battery cell. Each fusible conductor is configured to have extra length so as to enable relative in-plane and out-of-plane motions between the battery cell electrode and the current collector plate/current collector conductor pad. The fusible conductor is flexibly shaped so as to provide stretch or compression relief when subjected to force. Such mechanical flexibility allows a degree of play for relative motion of the battery cell/battery cell conductor pad and the current collector plate/current collector conductor pad.

A first end of the fusible conductor is coupled to the current conductor pad, and a second end of the fusible conductor is coupled to the battery cell conductor pad. Relative movement of the battery cell, and therefore the battery cell conductor pad, and the current collector conductor pad/current collector plate results in the two ends of the fusible conductor moving either toward or away from each other. The extra length included in the fusible conductor accommodates this relative movement. In some embodiments, a shape of the fusible conductor has one or more loops, such as a resilient spring in the shape of a spiral spring or an accordion spring. The extra length of the fusible conductor enables the two ends of the fusible conductor to expand or contract relative to each other according to the relative movement of the battery cell/battery cell conductor pad and the current collector plate/current collector conductor pad. The fusible conductor is made of a material having some degree of elasticity that allows this degree of flexibility.

In an exemplary embodiment, the battery cell has a cylindrical shape. The current collector conductor pad has a ring shape and the battery cell conductor pad has a circular shape. The current collector conductor pad, the battery cell conductor pad, and the battery cell are concentric. At least one spiral shaped fusible conductor is coupled between the current collector pad and the battery cell conductor pad. The path and shape of the fusible conductor is such that sufficient service loop length is achieved by allowing relative in-plane and out-of-plane motion between the battery cell/battery cell conductor pad and the current collector conductor pad/current collector plate.

In some embodiments, multiple battery cells are electrically connected as a battery pack. The battery pack includes a plurality of battery cells, a battery cell holder, and a plurality of fusible links, at least one fusible link coupled to at least one electrode of each battery cell in the battery pack. In some embodiments, at least one current collector plate is coupled to first electrodes of the plurality of battery cells. In some embodiments, the current collector conductor pads are coupled to the current collector pad. In other embodiments, a first fuse sheet is coupled to the current collector plate. The fuse sheet replaces all current collector conductor pads. The fuse sheet is a conductive sheet with the fusible conductors arranged into an array. The first end of each fusible conductor is integrally formed with the fuse sheet and the second end of each fusible link forms the battery cell conductor pad, which is coupled to the battery cell electrode.

FIG. 1 illustrates a structure for holding and storing a battery cell according to an embodiment. A battery cell holder 2 includes a battery cell chamber 12 have a form factor suitable for accommodating a battery cell within. The form factor of the battery cell chamber is form fitting to the battery cell so as to minimize or prevent movement of the battery cell relative to the battery cell holder 2. A first surface 4 includes an opening 8, and a second surface 6 includes an opening 10. The openings 8 and 10 are aligned with the battery cell chamber 12, and in particular are aligned with an anode electrode and a cathode electrode of a battery cell positioned within the battery cell chamber 12. In some embodiments, the battery cell holder 2 is made of an electrically resistant and thermally conductive material. In some embodiments, one or more of the side surfaces of the battery cell holder 2 are configured so as to enable access to the battery cell chamber 12 for repair or replacement of a battery cell. For example, the first surface 4 and/or the second surface 6 are panels that are attached using screws, latches, or hinges.

Figure 2:
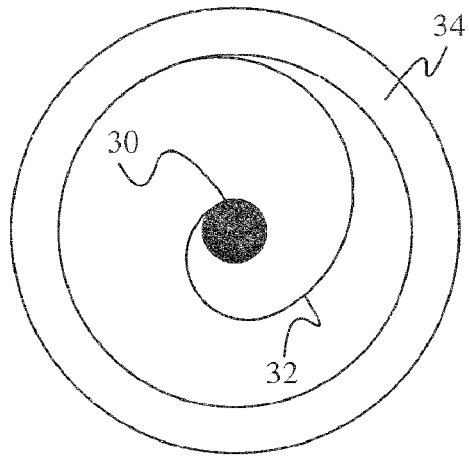
FIG. 2 illustrates a fusible link according to a first embodiment.

FIG. 2 illustrates a fusible link according to a first embodiment. The fusible link includes a battery cell conductor pad 30, a fusible conductor 32, and a current collector conductor pad 34. The battery cell conductor pad 30 is to be coupled to a battery cell electrode, as described in detail below. In some embodiments, the battery cell conductor pad 30, the fusible conductor 32, and the current collector conductor pad 34 are integrally connected.

Figure 3:
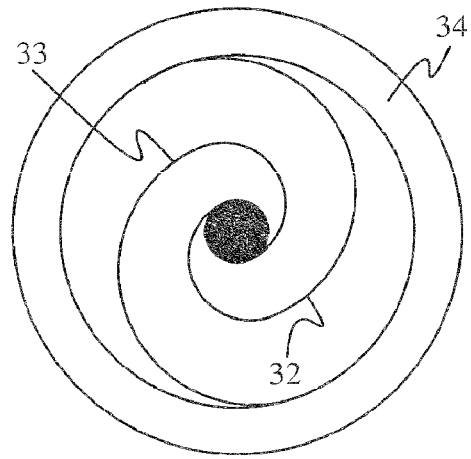
FIG. 3 illustrates a fusible link according to a second embodiment.

A fusible link can be configured with one or more fusible conductors coupled to a single battery cell conductor pad. FIG. 3 illustrates a fusible link according to a second embodiment. The fusible link of FIG. 3 includes the battery cell conductor pad 30, the fusible conductor 32, and the current collector conductor pad 34 of FIG. 2 plus an additional fusible conductor 33.

Figure 4:
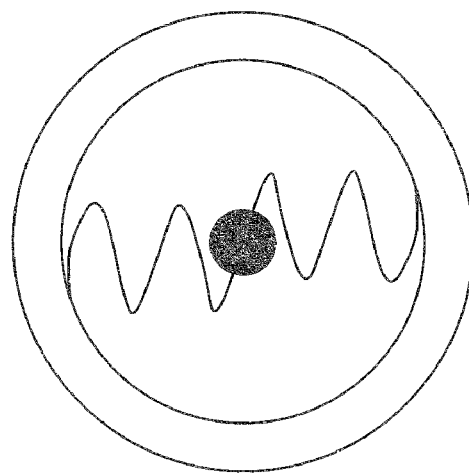
FIG. 4 illustrates a fusible link according to a third embodiment.

FIGS. 2 and 3 show embodiments in which the fusible conductor has a spiral shape to provide sufficient service loop length. In other embodiments, the fusible conductor can have a shape other than a spiral. FIG. 4 illustrates an alternative configuration in which two fusible conductors each have an accordion-like shape, also referred to as a zig-zag shape. It is understood that other shapes can be used. In general, any shape that provides excessive length for accommodating relative movement of a battery cell and a current collector element, such as a current collector conductor pad or a fuse sheet, can be used.

Figure 5A:
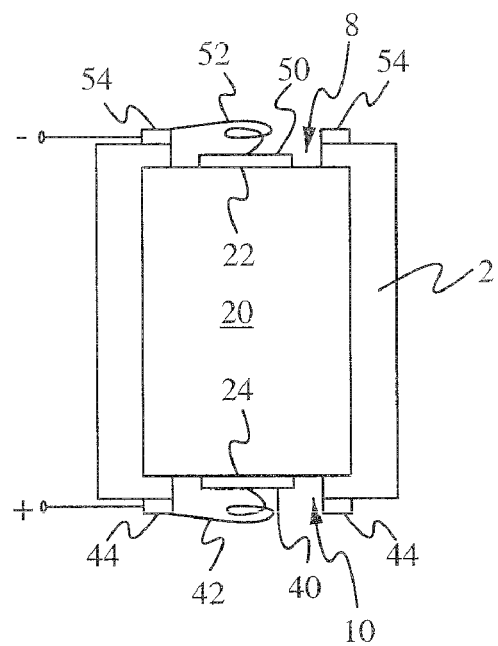
FIG. 5A illustrates a cut out side view of a fusible link assembly according to a first embodiment.

FIG. 5A illustrates a cut out side view of a fusible link assembly according to a first embodiment. The fusible link assembly includes a battery cell positioned within the battery cell holder of FIG. 1. A battery cell 20 has a first electrode 22 and a second electrode 24. In an exemplary configuration, the first electrode 22 is an anode electrode and the second electrode 24 is a cathode electrode. A first fusible link is coupled to the battery cell holder 2 and to the anode electrode 22 of the battery cell 20. A second fusible link is coupled to the battery cell holder 2 and to the cathode electrode 24 of the battery cell 20. In an exemplary configuration, the fusible links are each configured as the fusible link of FIG. 2. In this configuration, the first fusible link includes a battery cell conductor pad 50, a fusible conductor 52, and a current collector conductor pad 54. The second fusible link includes a battery cell conductor pad 40, a fusible conductor 42, and a current collector conductor pad 44. The battery cell conductor pad 50 of the first fusible link is electrically and mechanically coupled to the anode electrode 22. The current collector conductor pad 54 is mechanically coupled to the surface 4 (FIG. 1) of the battery cell holder 2. The current collector conductor pad 54 is positioned proximate the opening 8 in the battery cell holder 2. In the exemplary configuration where the current collector conductor pad 54 has a ring shape, as shown in FIG. 2, the current collector conductor pad 54 is positioned around the opening 8.

The battery cell conductor pad 40 of the second fusible link is electrically and mechanically coupled to the cathode electrode 24. The current collector conductor pad 44 is mechanically coupled to the surface 6 (FIG. 1) of the battery cell holder 2. The current collector conductor pad 44 is positioned proximate the opening 10 in the battery cell holder 2. In the exemplary configuration where the current collector conductor pad 44 has a ring shape, as shown in FIG. 2, the current collector conductor pad 44 is positioned around the opening 10. The current collector conductor pad 54 is coupled to an electrical lead to form a negative terminal and the current collector conductor pad 44 is coupled to an electrical lead to form a negative terminal. The positive and negative terminals can be coupled to external components.

Figure 5B:
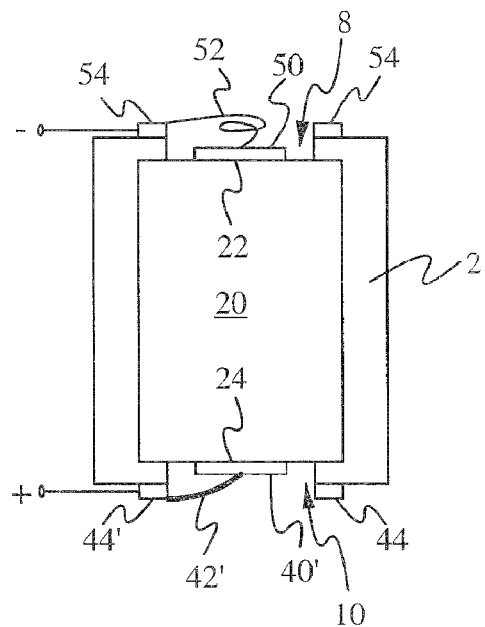
FIG. 5B illustrates a cut out side view of a fusible link assembly according to a second embodiment.

In some embodiments, a fusible link is coupled to only one of the two battery electrodes, and a non-fusible conductive link is coupled to the other electrode. FIG. 5B illustrates a cut out side view of a fusible link assembly according to a second embodiment. The fusible link assembly of FIG. 5B is the same as the fusible link assembly of FIG. 5A except that second fusible link of FIG. 5A is replaced with a non-fusible conductive link. In the exemplary configuration of FIG. 5B, a non-fusible conductor 42' is coupled to a battery cell conductor pad 40' and a current collector conductor pad 44'. Alternatively, any conventional conductive element can be used in place of the battery cell conductor pad 40', the non-fusible conductor 42', and the current collector conductor pad 44' to electrically couple the battery cell electrode 24 to the positive terminal. FIG. 5B shows the fusible link coupled to the battery anode electrode and to the negative terminal, and the non-fusible conductive link coupled to the battery cathode electrode and to the positive terminal. It is understood that the fusible link can be coupled to the battery cathode electrode and to the positive terminal, and the non-fusible conductive link can be coupled to the battery anode and to the negative terminal.

Various methods can be used to connect a battery cell conductor pad to a battery cell electrode. Methods for connecting a battery cell conductor pad to a battery cell electrode include, but are not limited to, resistance welding, laser welding, ultrasonic welding, mechanical fasteners, and conductive adhesives. Various method can be used to connect a current collector conductor pad to the battery cell holder. Methods for connecting a current collector conductor pad to a battery cell holder include, but are not limited to, adhesives, mechanical fasteners, and welding.

Figure 6:
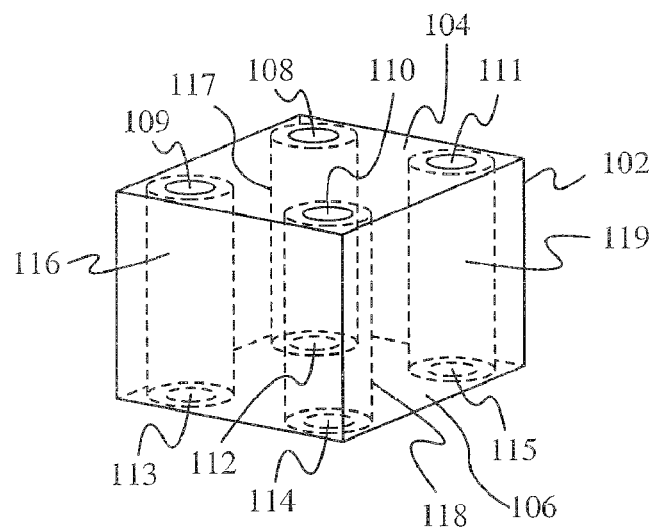
FIG. 6 illustrates a structure for holding and storing a plurality of battery cells according to an embodiment.

In some embodiments, multiple battery cells are electrically connected as a battery pack. FIG. 6 illustrates a structure for holding and storing a plurality of battery cells according to an embodiment. A battery cell holder 102 includes a plurality of battery cell chambers 116, 117, 118, 119 each having a form factor suitable for accommodating a battery cell within. The form factor of each battery cell chamber is form fitting to the battery cell so as to minimize or prevent movement of the battery cell relative to the battery cell holder 102. A first surface 104 includes a plurality of openings 108, 109, 110, 111. A second surface 106 includes a plurality of openings 112, 113, 114, 115. The openings 108 and 112 are aligned with the battery cell chamber 117, and in particular are aligned with an anode electrode and a cathode electrode of a battery cell positioned within the battery cell chamber 117. The openings 109 and 113 are aligned with the battery cell chamber 116, and in particular are aligned with an anode electrode and a cathode electrode of a battery cell positioned within the battery cell chamber 116. The openings 110 and 114 are aligned with the battery cell chamber 118, and in particular are aligned with an anode electrode and a cathode electrode of a battery cell positioned within the battery cell chamber 118. The openings 111 and 115 are aligned with the battery cell chamber 119, and in particular are aligned with an anode electrode and a cathode electrode of a battery cell positioned within the battery cell chamber 119. In some embodiments, the battery cell holder 102 is made of an electrically resistant and thermally conductive material. In some embodiments, one or more of the side surfaces of the battery cell holder 102 are configured so as to enable access to the battery cell chambers 116, 117, 118, 119 for repair or replacement of a battery cell. For example, the first surface 104 and/or the second surface 106 are panels that are attached using screws, latches, or hinges. It is understood that the battery pack can be configured to include more or less than four battery cells as shown in FIG. 6.

Figure 7:
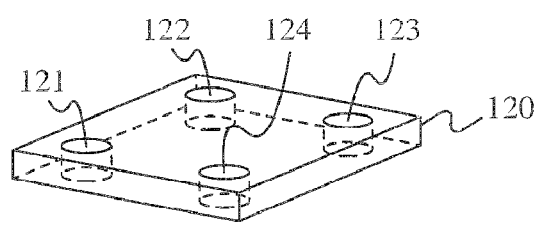
FIG. 7 illustrates a current collector plate according to an embodiment.

FIG. 7 illustrates a current collector plate according to an embodiment. A current collector plate 120 has plurality of through holes 121, 122, 123, 123. A first current collector plate is configured to be coupled to the first surface 104 of the battery cell holder 102 of FIG. 6, and a second current collector plate is configured to be coupled to the second surface 106 of the battery cell holder 102. As such, the number of through holes in the current collector plate 120 matches the number of openings in the first surface 104/second surface 106 of the battery cell holder 102. In this exemplary configuration, there are four through holes in the current collector plate. When the current collector plate 120 is coupled to the first surface 104, the through hole 121 is aligned with the opening 109, the through hole 122 is aligned with the opening 108, the through hole 123 is aligned with the opening 111, and the through hole 124 is aligned with the opening 110. When the current collector plate 120 is coupled to the second surface 106, the through hole 121 is aligned with the opening 113, the through hole 122 is aligned with the opening 112, the through hole 123 is aligned with the opening 115, and the through hole 124 is aligned with the opening 114.

Figure 8:
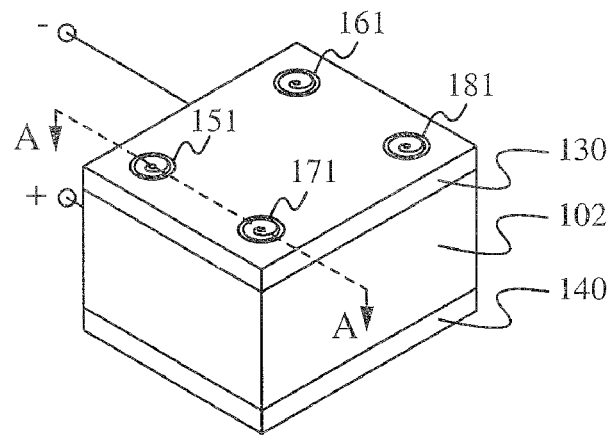
FIG. 8 illustrates an isometric view of an assembled battery pack according to a first embodiment.

FIG. 8 illustrates an isometric view of an assembled battery pack according to a first embodiment. The assembled battery pack includes the battery cell holder 102 of FIG. 6, a first current collector plate 130, and a second current collector plate 140. The first current collector plate 130 and the second current collector plate 140 have the same configuration as the current collector plate 120 of FIG. 7. The battery pack also includes four fusible links 151, 161, 171, 181 coupled to the exposed surface of the current collector plate 130, and four fusible links (not shown) coupled to the exposed surface (not shown) of the current collector plate 140.

FIG. 9 illustrates a cut out side view along the line A-A of the battery pack of FIG. 8. A battery cell 190 is positioned with the battery cell chamber 116 (FIG. 6) and a battery cell 194 is positioned within the battery cell chamber 118. The battery cell 190 has a first electrode 191 and a second electrode 192. The battery cell 194 has a first electrode 195 and a second electrode 196. In an exemplary configuration, the first electrodes 191, 195 are each anode electrodes and the second electrodes 192, 196 are each cathode electrodes. The fusible link 151 (FIG. 8) is coupled to the current collector plate 130 and to the anode electrode 191 of the battery cell 190. Another fusible link is coupled to the current collector plate 140 and to the cathode electrode 192 of the battery cell 190. The fusible link 171 (FIG. 8) is coupled to the current collector plate 130 and to the anode electrode 195 of the battery cell 194. Another fusible link is coupled to the current collector plate 140 and to the cathode electrode 196 of the battery cell 194. In an exemplary configuration, the fusible links are each configured as the fusible link of FIG. 2. It is understood that alternatively configured fusible links can be used. The fusible link 151 includes a battery cell conductor pad 150, a fusible conductor 152, and a current collector conductor pad 154. The fusible link coupled to the cathode electrode 192 includes a battery cell conductor pad 200, a fusible conductor 202, and a current collector conductor pad 204. The fusible link 171 includes a battery cell conductor pad 170, a fusible conductor 172, and a current collector conductor pad 174. The fusible link coupled to the cathode electrode 196 includes a battery cell conductor pad 210, a fusible conductor 212, and a current collector conductor pad 214.

The battery cell conductor pad 150 is electrically and mechanically coupled to the anode electrode 191. The current collector conductor pad 154 is electrically and mechanically coupled to the exposed surface of the current collector plate 130. The current collector conductor pad 154 is positioned proximate the through hole 121 (FIG. 7) in the current collector plate 130. In the exemplary configuration where the current collector conductor pad 154 has a ring shape, as shown in FIG. 2, the current collector conductor pad 154 is positioned around the through hole 121. The battery cell conductor pad 200 is electrically and mechanically coupled to the cathode electrode 192. The current collector conductor pad 204 is electrically and mechanically coupled to the exposed surface of the current collector plate 140. The current collector conductor pad 204 is positioned proximate the through hole 121 (FIG. 7) in the current collector plate 140. In the exemplary configuration where the current collector conductor pad 204 has a ring shape, as shown in FIG. 2, the current collector conductor pad 204 is positioned around the through hole 121.

The battery cell conductor pad 170 is electrically and mechanically coupled to the anode electrode 195. The current collector conductor pad 174 is electrically and mechanically coupled to the exposed surface of the current collector plate 130. The current collector conductor pad 174 is positioned proximate the through hole 124 (FIG. 7) in the current collector plate 130. In the exemplary configuration where the current collector conductor pad 174 has a ring shape, as shown in FIG. 2, the current collector conductor pad 174 is positioned around the through hole 124. The battery cell conductor pad 210 is electrically and mechanically coupled to the cathode electrode 196. The current collector conductor pad 214 is electrically and mechanically coupled to the exposed surface of the current collector plate 140. The current collector conductor pad 214 is positioned proximate the through hole 124 (FIG. 7) in the current collector plate 140. In the exemplary configuration where the current collector conductor pad 214 has a ring shape, as shown in FIG. 2, the current collector conductor pad 214 is positioned around the through hole 124.

The current collector plate 130 is coupled to an electrical lead to form a negative terminal and the current collector plate 140 is coupled to an electrical lead to form a positive terminal. The positive and negative terminals can be coupled to external components.

Figure 9A:
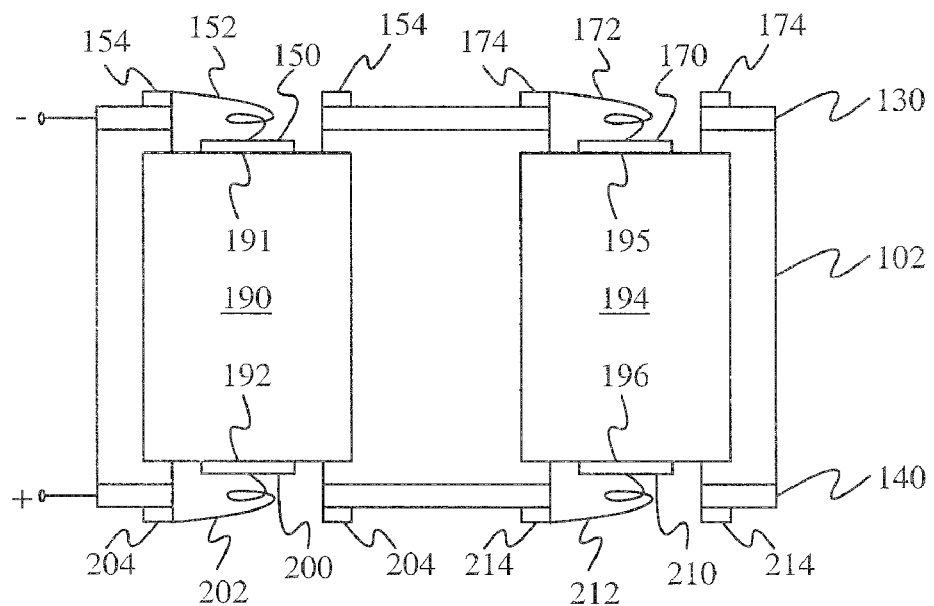
FIG. 9A illustrates a cut out side view along the line A-A of the battery pack of FIG. 8.
Figure 9B:
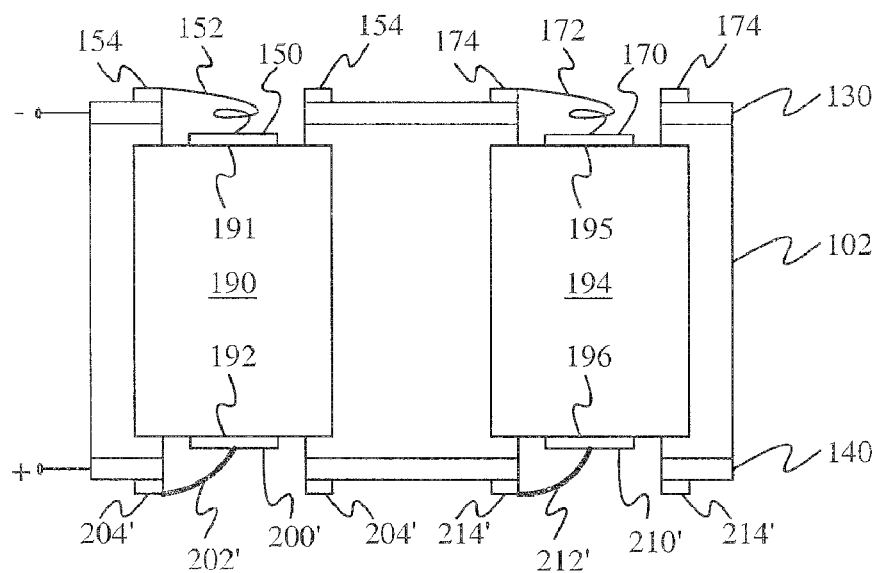
FIG. 9B illustrates a cut out side view of a battery pack according to a second embodiment.

In some embodiments, a fusible link is coupled to only one of the two battery electrodes of each battery cell in the battery pack, and a non-fusible conductive link is coupled to the other electrode. FIG. 9B illustrates a cut out side view of a battery pack according to a second embodiment. The battery pack of FIG. 9B is the same as the battery pack of FIG. 9A except that second fusible links coupled to each battery cell of FIG. 9A are replaced with non-fusible conductive links. In the exemplary configuration of FIG. 9B, anon-fusible conductor 202' is coupled to a battery cell conductor pad 200' and a current collector conductor pad 204', and a non-fusible conductor 212' is coupled to a battery cell conductor pad 210' and a current collector conductor pad 214'. Alternatively, any conventional conductive element can be used in place of the battery cell conductor pad 200', the non-fusible conductor 202', and the current collector conductor pad 204' to electrically couple the battery cell electrode 192 to the positive terminal, and any conventional conductive element can be used in place of the battery cell conductor pad 210', the non-fusible conductor 212', and the current collector conductor pad 214' to electrically couple the battery cell electrode 196 to the positive terminal FIG. 9B shows fusible links coupled to each of the battery anode electrodes and to the negative terminal, and non-fusible conductive links coupled to each of the battery cathode electrodes and to the positive terminal. It is understood that fusible links can be coupled to each of the battery cathode electrodes and to the positive terminal, and non-fusible conductive links can be coupled to each of the battery anode electrodes and to the negative terminal.

Various methods can be used to connect current collector conductor pads to a current collector plate, as well as connecting a battery cell conductor pad to a battery cell electrode. Methods for connecting current collector conductor pads to a current collector plate include, but are not limited to, resistance welding, laser welding, ultrasonic welding, brazing, soldering mechanical fasteners, and conductive adhesives. Methods for connecting a battery cell conductor pad to a battery cell electrode include, but are not limited to, resistance welding, laser welding, ultrasonic welding, mechanical fasteners, and conductive adhesives. Various method can be used to connect a current collector plate to the battery cell holder. Methods for connecting a current collector conductor plate to a battery cell holder include, but are not limited to, adhesives, mechanical fasteners, and welding.

Figure 10:
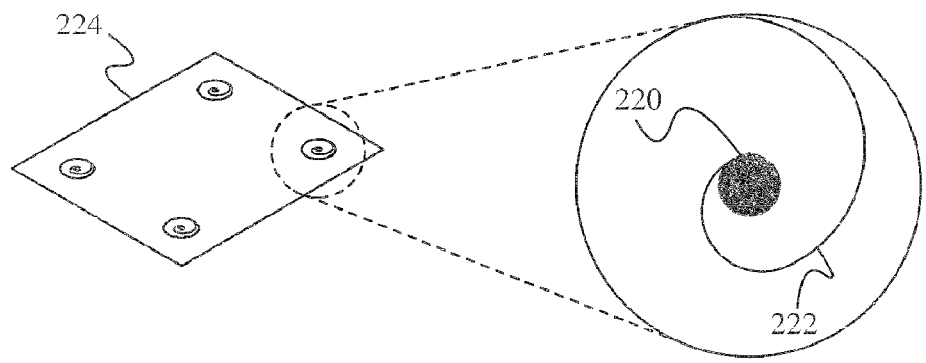
FIG. 10 illustrates a isometric view of a fuse sheet according to an embodiment.

Alternative embodiments are directed to replacing the individual fusible links with a fuse sheet coupled to each current collector plate. FIG. 10 illustrates a isometric view of a fuse sheet according to an embodiment. A fuse sheet 224 is a thin foil having one or more layers of an electrically conductive material. An array of fusible links are integrally formed from the fuse sheet. In the exemplary configuration of FIG. 10, four fusible links are formed within the fuse sheet 224 so as to match the four openings in the battery cell holder 102 (FIG. 6) and the four through holes in the current collector plate 120 (FIG. 7). The array of fusible links are positioned to align with the through holes in the current collector plate. In an exemplary configuration, each fusible link includes a fusible conductor 222 and a battery cell conductor pad 220. It is understood that alternative configurations are contemplated for each fusible link, such as multiple fusible conductors, as in FIG. 3, or the conductor(s) having a shape other than a spiral, such as in FIG. 4. The current collector conductive pads of each individual fusible link, such as the current collector conductive pad 34 in FIG. 2, are collectively replaced by the fuse sheet 224. The fuse sheet 224 is aligned with a current collector plate so as to align the array of fusible links with the array of through holes in the current collector plate. The fuse sheet can be coupled to the current collector plate using one of the same methods used to couple the current collector conductive pad to the current collector plate described above.

Figure 11:
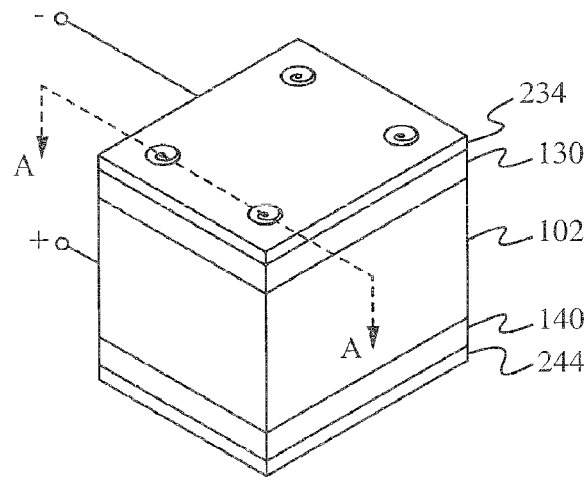
FIG. 11 illustrates an isometric view of an assembled battery pack according to a third embodiment.

FIG. 11 illustrates an isometric view of an assembled battery pack according to a third embodiment. The assembled battery pack of FIG. 11 is similar to that of the assembled battery pack of FIG. 8 except that the fusible links in FIG. 8 are replaced by fuse sheets such as those shown in FIG. 10. In particular, the battery pack of FIG. 11 includes the battery cell holder 102, the first current collector plate 130, and the second current collector plate 140 of FIG. 8. The battery pack also includes a fuse sheet 234 coupled to the current collector plate 130, and a fuse sheet 244 coupled to the current collector plate 140.

Figure 12A:
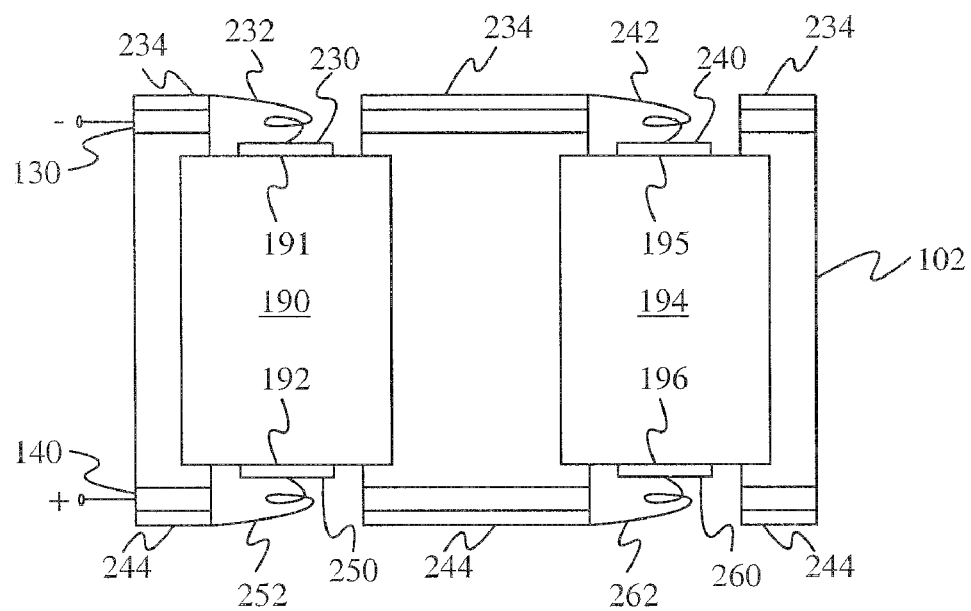
FIG. 12A illustrates a cut out side view along the line A-A of the battery pack of FIG. 11.

FIG. 12A illustrates a cut out side view along the line A-A of the battery pack of FIG. 11. The cut out side view shown in FIG. 12A is the same as the cut out side view of FIG. 9A except that the fusible links including the battery cell conductor pads 150, 170, the current collector conductor pads 154, 174, and the fusible conductors 152, 172 in FIG. 9A are replaced by the fuse sheet 234 having the battery cell conductor pads 230, 240 and the fusible conductors 232, 242, and the fusible links including the battery cell conductor pads 200, 210, the current collector conductor pads 204, 214, and the fusible conductors 202, 212 in FIG. 9A are replaced by the fuse sheet 244 having the battery cell conductor pads 250, 260 and the fusible conductors 252, 262.

Figure 12B:
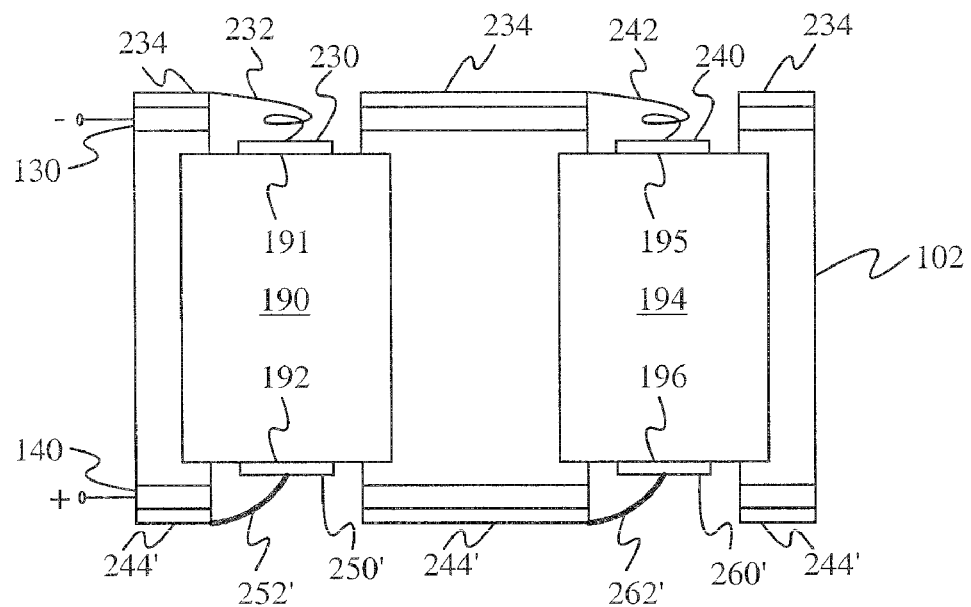
FIG. 12B illustrates a cut out side view of a battery pack according to a fourth embodiment.

In some embodiments, a fuse sheet having fusible links is coupled to only one of the two current collector plates, and a conductive sheet having non-fusible links is coupled to the other current collector plate. FIG. 12B illustrates a cut out side view of a battery pack according to a fourth embodiment. The battery pack of FIG. 12B is the same as the battery pack of FIG. 12A except that second fuse sheet 244 coupled to the current collector plate 140 of FIG. 12A is replaced with conductive sheet 244 having non-fusible links. In the exemplary configuration of FIG. 12B, the non-fusible links include a non-fusible conductor 252' coupled to a battery cell conductor pad 250', and a non-fusible conductor 262' coupled to a battery cell conductor pad 260'. Alternatively, any conventional conductive elements can be used in place of the non-fusible links. FIG. 12B shows a fuse sheet coupled to each of the battery anode electrodes and to the negative terminal, and non-fusible conductive sheet coupled to each of the battery cathode electrodes and to the positive terminal. It is understood that the fuse sheet can be coupled to each of the battery cathode electrodes and to the positive terminal, and the non-fusible conductive sheet can be coupled to each of the battery anode electrodes and to the negative terminal.

The fusible links and/or the fuse sheet including an array of fusible links can be fabricated using any conventional manufacturing or fabrication process including, but not limited to, etching, stamping, or laser cutting of thin foils made of materials comprising, for example, aluminum, copper, nickel, zinc, or any combination thereof. The cross-sectional area of the fusible conductor within the fusible link determines the current rating of the fusible link. In an exemplary application, the normal operating current of a battery cell is about 4 amps, and the current at which the fusible conductor melts is about 22 amps.

Embodiments of the battery pack described in relation to FIGS. 8, 9, 11, and 12 are directed to a single anode current collector plate and a single cathode current collector plate. In other embodiments, more than one anode current collector plate and more than one cathode current collector plate can be used. For example, a first anode current collector plate can be coupled to the battery cells in battery cell chambers 116 and 118, and a second anode current collector plate can be coupled to the battery cells in the battery cell chambers 117 and 119.

Embodiments of the battery pack described in relation to FIGS. 8, 9, 11, and 12 are directed to a single anode-side fuse sheet and a single cathode-side fuse sheet. In other embodiments, more than one anode-side fuse sheet and more than one cathode-side fuse sheet can be used.

It is to be understood that the above description is intended to be illustrative and not restrictive. Many variations of the fusible link will be apparent to those of skill in the art upon reviewing the above description. These variations can, for example, include the shape and size of the current collector conductor pad, the shape and size of the battery cell conductor pad, the battery cell form factor, and the shape and path of the fusible conductor.

The fusible link has been described in terms of specific embodiments incorporating details to facilitate the understanding of the principles of construction and operation of the fusible link. Such references, herein, to specific embodiments and details thereof are not intended to limit the scope of the claims appended hereto. It will be apparent to those skilled in the art that modifications can be made in the embodiments chosen for illustration without departing from the spirit and scope of the fusible link.

I claim:

1. A fusible link assembly connected to a battery cell, the fusible link assembly comprising:
   a fuse sheet made of electrically conductive material, wherein the fuse sheet has a planar body; and
   a plurality of fusible links, each fusible link is connected to the fuse sheet,
   wherein each fusible link of the plurality of fusible links is configured to include at least one of an in-plane movement and an out-of-plane movement relative to the fuse sheet and
   wherein each fusible link of the plurality of fusible links opens when a current flow through each fusible link of the plurality of fusible links reaches a corresponding threshold current that is based on a cross-sectional area of each fusible link of the plurality of fusible links.

2. The fusible link assembly of claim 1, further comprising a plurality of battery cell conductor pads each coupled to one fusible link of the plurality of fusible links.

3. The fusible link assembly of claim 2, wherein each of the plurality of battery cell conductor pads are configured to be coupled to a respective battery cell of an electric vehicle.

4. The fusible link assembly of claim 1, wherein locations within the fuse sheet of each fusible link of the plurality of fusible links align with corresponding openings in a battery cell holder.

5. The fusible link assembly of claim 1, wherein each fusible link of the plurality of fusible links are fabricated via etching, stamping, or laser cutting.

6. The fusible link assembly of claim 1, wherein at least one fusible link of the plurality of fusible links has a spiral shape.

7. The fusible link assembly of claim 1, wherein the plurality of fusible links are defined in an array by the fuse sheet.

8. The fusible link assembly of claim 1, further comprising a current collector plate coupled to a surface of the planar body of the fuse sheet.

9. The fusible link assembly of claim 1, wherein the fuse sheet is an anode-side fuse sheet and further comprising a corresponding second fuse sheet that is a cathode-side fuse sheet.

10. A fusible link assembly connected to a plurality of battery cells, the fusible link assembly comprising:
    a fuse sheet made of electrically conductive material;
    a plurality of fusible links, each fusible link is connected to the fuse sheet; and
    a current collector plate coupled to the fuse sheet,
    wherein each fusible link of the plurality of fusible links is configured to include at least one of an in-plane movement and an out-of-plane movement relative to the fuse sheet and located within the fuse sheet such that each fusible link of the plurality of fusible links aligns with corresponding openings in the current collector plate, and
    wherein each fusible link of the plurality of fusible links opens when a current flow through each fusible link of the plurality of fusible links reaches a corresponding threshold current that is based on a cross-sectional area of each fusible link of the plurality of fusible links.

11. The fusible link assembly of claim 10, further comprising a plurality of battery cell conductor pads each coupled to one fusible link of the plurality of fusible links.

12. The fusible link assembly of claim 10, wherein the fuse sheet is an anode-side fuse sheet and further comprising a corresponding second fuse sheet that is a cathode-side fuse sheet.

* * * * *